US012712975B2

(12) United States Patent
Oppilamani et al.

(10) Patent No.: US 12,712,975 B2
(45) Date of Patent: Aug. 18, 2026

(54) METHOD AND APPARATUS FOR USER-DESIGNATED PRIORITIES IN ONLINE CHARGING

(71) Applicant: Telefonaktiebolaget LM Ericsson (publ), Stockholm (SE)

(72) Inventors: Ramanathan Oppilamani, Chennai (IN); Rameshwaran Thulasidoss, Chennai (IN); R. Kumar, Chennai (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 423 days.

(21) Appl. No.: 18/011,673

(22) PCT Filed: Sep. 25, 2020

(86) PCT No.: PCT/SE2020/050902
§ 371 (c)(1),
(2) Date: Dec. 20, 2022

(87) PCT Pub. No.: WO2021/262059
PCT Pub. Date: Dec. 30, 2021

(65) Prior Publication Data

US 2023/0262171 A1 Aug. 17, 2023

(30) Foreign Application Priority Data

Jun. 26, 2020 (IN) ............................ 202011027097

(51) Int. Cl.
*H04W 4/24* (2024.01)
*H04M 15/00* (2006.01)

(52) U.S. Cl.
CPC ......... *H04M 15/785* (2013.01); *H04M 15/61* (2013.01); *H04M 15/64* (2013.01); *H04M 15/854* (2013.01)

(58) Field of Classification Search
CPC ...................................................... H04W 4/24
See application file for complete search history.

(56) References Cited

U.S. PATENT DOCUMENTS 9,049,590 B1 * 6/2015 Hirschman ....... H04M 15/7652
2013/0151710 A1 6/2013 D'Souza et al.
(Continued)

FOREIGN PATENT DOCUMENTS

CN 101277204 A 10/2008
CN 103339897 A 10/2013
(Continued)

OTHER PUBLICATIONS

Office Action mailed Dec. 24, 2024 for Chinese Patent Application No. 202080102424.2, 11 pages (includes English translation).
(Continued)

*Primary Examiner* — Barry W Taylor
(74) *Attorney, Agent, or Firm* — Sage Patent Group

(57) ABSTRACT

A node (30) of a charging system (28) associated with a communication network (10) considers subscriber-designated priorities in a circumstance that involves two or more communication services "competing" for the same pool of credit that is used in online charging for consumption of the two or more communication services. As an example, subscriber information (34) associated with a user device (12) includes input from the involved subscriber that designates a certain communication service as a prioritized communication service. In a case where granting quotas of service units for authorizing service consumption and making corresponding credit reservations involves competition between a subscriber-prioritized service and another service not prioritized by the subscriber, the node (30) adapts its granting operations to give preference to the subscriber-prioritized service.

18 Claims, 8 Drawing Sheets

(56) References Cited

U.S. PATENT DOCUMENTS

| | | | | |
|---|---|---|---|---|
| 2014/0068058 | A1* | 3/2014 | Wolf | H04M 1/72448 709/224 |
| 2014/0378094 | A1* | 12/2014 | Gillick | H04M 15/785 455/406 |
| 2015/0038111 | A1 | 2/2015 | Lopez Nieto et al. | |
| 2018/0205698 | A1* | 7/2018 | Gupta | H04W 8/18 |

FOREIGN PATENT DOCUMENTS

| | | | |
|---|---|---|---|
| CN | 103460642 | A | 12/2013 |
| CN | 106576217 | A | 4/2017 |
| CN | 107078915 | A | 8/2017 |
| CN | 107431629 | A | 12/2017 |
| CN | 109417486 | A | 3/2019 |
| CN | 110024330 | A | 7/2019 |
| EP | 1804478 | A1 | 7/2007 |
| EP | 2816792 | A1 | 12/2014 |
| WO | 2019013678 | A1 | 1/2019 |
| WO | 2019068360 | A1 | 4/2019 |
| WO | 2019120531 | A1 | 6/2019 |
| WO | 2020119900 | A1 | 6/2020 |

OTHER PUBLICATIONS

Second Office Action mailed May 27, 2025 for Chinese Patent Application No. 202080102424.2, 7 pages.

* cited by examiner

METHOD AND APPARATUS FOR USER-DESIGNATED PRIORITIES IN ONLINE CHARGING

TECHNICAL FIELD

The present invention relates to online charging for communication services and accounting for user-designated priorities in granting service units for authorizing consumption of the communication services.

BACKGROUND

"Online" charging in the context of charging for the consumption by a user device of a communication service provided via a communication network refers to procedures involving real-time decisions about whether to authorize initial or continued consumption of the service based on the availability of credit in an account linked to the user device. In an example of online charging, a network entity sends a request to a charging system, requesting a grant of units for authorizing consumption of a communication service by a user device. The charging system grants a quota of units corresponding to a certain amount of service usage and makes a corresponding credit reservation against a credit account associated with the user device. The granted units may be referred to as "service units", as they represent units of consumption of the involved communication service.

The size of the credit reservation depends on the number of units granted—the quota size—and a "rating function" that determines the value of the granted quota expressed in whatever terms are applicable to the credit account. Because the granted quota provides authorization for only a certain amount of service consumption, e.g., a certain number of voice minutes or a certain amount of data transfer, charging operations for a communication session may include an initial request for a grant of service units, followed by one or more intermediate requests, to cover corresponding increments of continued use of the communication service by the user device, which may also be referred to as a "User Equipment" or UE.

Because each granted quota for a given communication service involves a credit reservation, the amount of credit reserved for the granted quota is unavailable for granting quotas for any other communication services that may be active at the same time for the user device. Reconciliation operations by the charging system involve subsequently debiting the full credit reservation from the account if a granted quota is completely consumed, or "returning" all or a portion of the reserved credit if a granted quota is not used or is used only partially.

Under a scheme referred to as "Dynamic Service Configuration" or DSC, the size of granted quotas may grow during a given charging session, based on several factors. In an example case, a charging session relates to a data session by a user device, involving the transfer of data to or from the user device via a communication network. An initial charging request establishes a charging session, and additional charging requests are used to continue the charging session. With DSC, the size of granted quotas may grow over successive charging requests received for the session, in dependence on how quickly the previously-granted quotas are consumed. One advantage of DSC is that it can reduce signaling overhead by reducing the number of charging requests that need to be issued for continuing a session, based on increasing the size of the granted quotas to match observed consumption behavior.

SUMMARY

A node of a charging system associated with a communication network considers subscriber-designated priorities in a circumstance that involves two or more communication services "competing" for the same pool of credit that is used in online charging for consumption of the two or more communication services. As an example, subscriber information associated with a User Equipment (UE) includes input from the involved subscriber that designates a certain communication service as a prioritized communication service. In a case where granting quotas of service units for authorizing service consumption and making corresponding credit reservations involves competition between a subscriber-prioritized service and another service not prioritized by the subscriber, the node adapts its granting operations to give preference to the subscriber-prioritized service.

In one example embodiment, a method of operation is performed by a network node of a charging system for a communication network. The method includes receiving a request for a grant of service units for authorizing consumption of a first communication service provided by the communication network to a UE that is associated with subscriber information maintained by or accessible to the network node. The method further includes the network node determining from the subscriber information that a subscriber associated with the subscriber information has designated the first communication service as a prioritized communication service. Further, the method includes the network node applying a preferential granting scheme in which granting service units in response to the request is prioritized with respect to a competing request for a grant of service units for a second communication service that is not prioritized according to the subscriber information.

In another example embodiment, a network node is configured for operation in a charging system for a communication network and includes communication interface circuitry and processing circuitry that is operatively associated with the communication circuitry. The processing circuitry is configured to receive, via the communication interface circuitry, a request for a grant of service units for authorizing consumption of a first communication service provided by the communication network to a UE that is associated with subscriber information maintained by or accessible to the network node. The processing circuitry is further configured to determine from the subscriber information that a subscriber associated with the subscriber information has designated the first communication service as a prioritized communication service. Still further, the processing circuitry is configured to apply a preferential granting scheme in which a grant of service units in response to the request is prioritized with respect to a competing request for a grant of service units for a second communication service that is not prioritized according to the subscriber information.

In yet another example embodiment, a network node is configured for operation in a charging system for a communication network and includes a number of processing units or modules, such as may be implemented using virtualization of computational and memory resources on a host computer of a data center. The processing units include a receiving unit that is configured for receiving a request for a grant of service units for authorizing consumption of a first communication service provided by the communication network to a UE that is associated with subscriber information maintained by or accessible to the network node. A determining unit is configured to determine from the subscriber information that a subscriber associated with the subscriber information has designated the first communication service as a prioritized communication service. Correspondingly, an applying unit is configured to apply a preferential granting scheme in which granting of service units in response to the request is prioritized with respect to a competing request for a grant of service units for a second communication service that is not prioritized according to the subscriber information.

Of course, the present invention is not limited to the above features and advantages. Indeed, those skilled in the art will recognize additional features and advantages upon reading the following detailed description, and upon viewing the accompanying drawings.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where a step must necessarily follow or precede another step due to some dependency. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Figure 1:
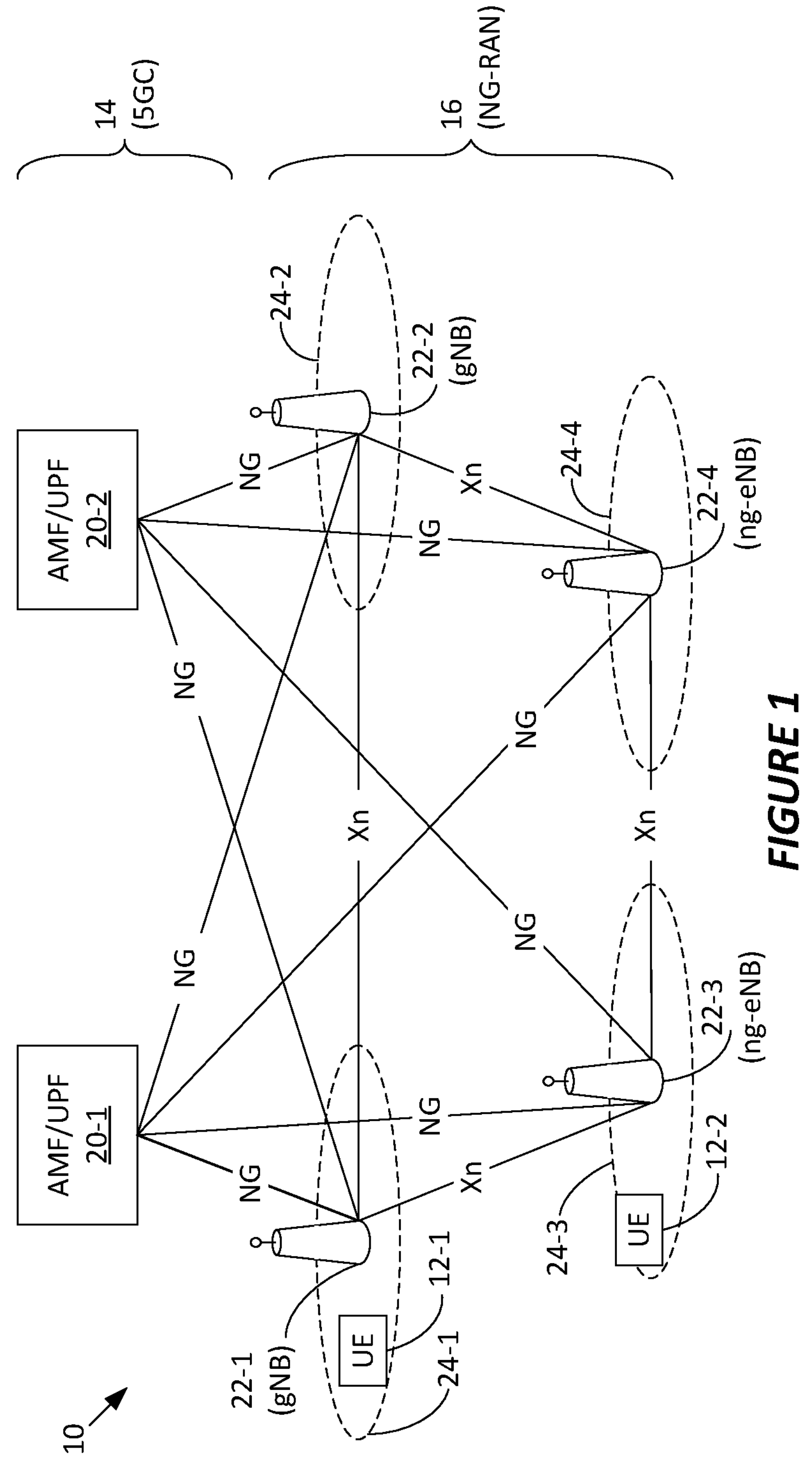
FIG. 1 is a block diagram of one embodiment of a communication network.

FIG. 1 is a network diagram of one embodiment of a communication network 10 that is configured as a Third Generation Partnership Project (3GPP) Fifth Generation (5G) wireless communication network, to provide communication services to respective user devices 12, shown here for example purposes as User Equipments (UEs) 12-1 and 12-2.

Unless suffixing is needed for clarity, a given UE is referred to as a UE 12, and given UEs are referred to as UEs 12. Further, the 5G example is non-limiting and the techniques disclosed herein have broad applicability to online charging in a variety of different networks.

In its example form, the communication network 10 includes a Next Generation RAN (NG-RAN) 16 and a 5G Core (5GC) 14. The NG-RAN 16 can include a set of base stations 22, such as base stations 22-1 and 22-2, which are configured as gNodeBs (gNBs) that provide an air interface for communicating with given UEs 12 that is based according to the 5G New Radio (NR) specifications. Of course, the NG-RAN 16 may provide other Radio Access Technologies (RATs), such as by including other types or configurations of base stations 22, with the base stations 22-3 and 22-4 operating as "ng-eNBs" that provide a Long Term Evolution (LTE) air interface according to the applicable 3GPP specifications.

The base stations 22 interconnect with each other via "Xn" interfaces and interconnect to one or more nodes in the core network 14 via "NG" interfaces. The diagram illustrates the core network 14 as including network nodes operative as Access and Mobility Functions (AMFs) and User Plane Functions (UPFs), as seen in the example nodes 20-1 and 20-2. However, the core network 14 may include more AMFs and/or UPFs and may include a variety of other nodes providing various types of Network Functions (NFs).

Each of the base stations 22 provides radio coverage over a corresponding area 24 that may be statically determined by the location of the base station 22 and its antenna configuration, or may be dynamically determined, e.g., using beam steering. The term "cell" may be used generically in reference to each coverage area 24, with the understanding that such cells may comprise beamformed coverage and may not be static.

Figure 2:
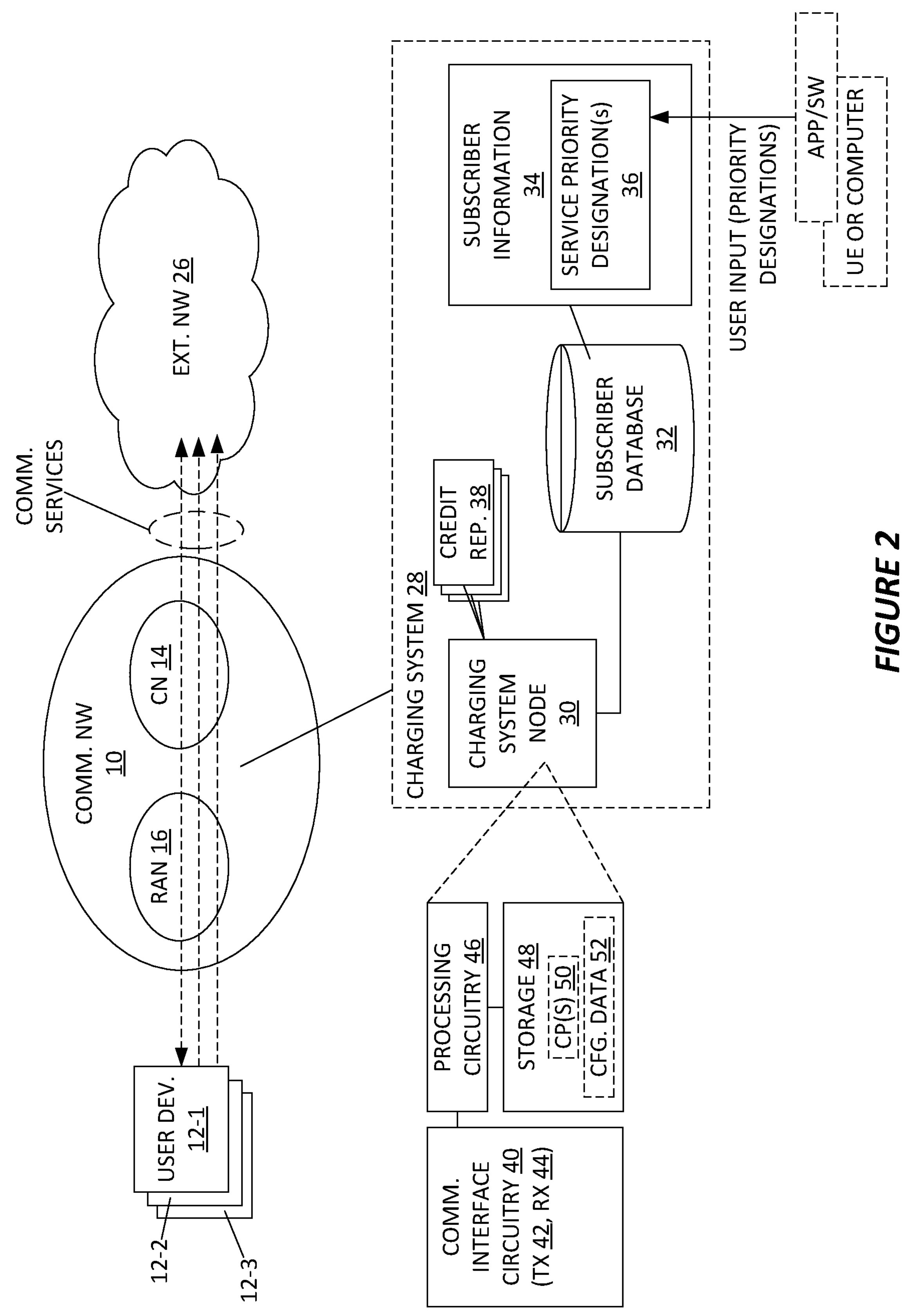
FIG. 2 is a block diagram of one embodiment of a network node of an online charging system that is included in or associated with a communication network.

FIG. 2 illustrates another embodiment of the communication network 10, shown in communicative coupling with one or more external networks 26 that are associated with one or more communication services, e.g., voice calls, music and video services, web browsing, social media services, etc. In this respect, the communication network 10 operates as an access network, providing respective UEs 12 with access to one or more types of communication services, with at least some of those communication services being subject to online charging.

In that regard, FIG. 2 depicts a charging system 28 that is configured to support online charging for use of the communication network 10 by UEs 12 in accessing one or more communication services or types of services. As such, the charging system 28 may be referred to as an OCS 28, denoting it as an "Online Charging System".

While the user devices 12-1, 12-2, and 12-3 appear in the diagram for example purposes, no limitation attends the example count. The communication network 10 may support any number of UEs 12 at any given time. Further, as noted, the reference number "12" is used herein to refer to UEs/user devices in the singular and plural senses and the suffixing is omitted where not needed for clarity.

The communication network 10 allows the UEs 12 access to one or more communication services, such as may be available from servers, systems, or other devices accessible via the Internet or another external network 26. In the example case, the communication network 10 is a wireless communication network that includes a Radio Access Network (RAN) 16 that provides an air interface for communicatively coupling to the UEs 12, which, in this particular example, includes radio transceiver circuitry configured for communicating with the RAN 16, according to the applicable radio signal types, structure, timing, and protocols. As a non-limiting example, the communication network 10 operates according to the Fifth Generation (5G) specifications and the RAN 16 provides a New Radio (NR) interface.

The charging system 28 includes one or more charging system nodes, with an example charging system node 30 depicted. The charging system node 30 contains or has access to the subscriber database 32 regarding subscriber accounts, also referred to as user accounts. In this context, a "subscriber" is a person or other entity associated with stored credit that is used to "pay" for the use of one or more communication services provided by or through the communication network 10. For example, a subscriber may have an account directly with the operator of the communication network 10, to pay for communication services consumed by one or more UEs 12 that are owned by the subscriber or are otherwise linked to the account and authorized for such usage. Alternatively, the subscriber may have an account with another network operator who in turn has an agreement with the operator of the network 10.

In the example of FIG. 2, the charging system node 30, also referred to as "the network node 30", includes or has access to a subscriber database 32. The subscriber database 32 includes subscriber information 34 for individual subscribers, including one or more service priority designations 36 that are input by the subscriber, e.g., using a self-care application or a browser-based interface that is configured to provide the subscriber with a mechanism for indicating prioritizations of certain communication services or, equivalently, types of communication services. As will be explained, the subscriber-designated prioritizations are accounted for in online charging operations, in circumstances where the granting of service units for authorizing the consumption by a UE 12 of one communication service competes with the granting of service units for authorizing the consumption by the UE 12 of another communication service.

Consider an example case where a UE 12 attempts to establish a communication session for using (consuming) a first communication service via the communication network 10, where the service is subject to online charging. A session management function (SMF) or other entity in the communication network 10 sends an initial charging request to the charging system node 30, to establish a charging session for authorizing consumption of the communication service by the UE 12. The charging system node 30 grants a "quota" of service units responsive to the initial request, where the number of service units in the granted quota corresponds to a defined amount of the service, such as defined in terms of minutes, megabytes, or other metering unit.

The number of units included in the initial grant depends on a variety of factors, including the type of service, configured rules, the number of units requested, and the availability of credit for "paying" for the units. The value or amount of credit depends on a "rating function" that translates between the service units used to meter consumption of the involved service and the involved units of credit, which may or may not be monetary. Thus, in making the initial grant, the charging system node 30 "reserves" an amount of credit corresponding to the size of the grant—the "granted quota". Continuing the charging session requires the network element to send subsequent charging requests, with the charging system node 30 granting a corresponding quota of service units responsive to each such request, subject to sufficient credit being available for reservation in the credit repository 38 that is subject to charging. "Credit Rep." in the diagram denotes "credit repository". Reserved credit corresponding to consumed quotas is debited from the credit repository 38, while any reserved credit corresponding to quota portions that end up not being consumed is cleared, making it available for new reservations.

However, while a reservation is active, the corresponding reserved credit in the credit repository 38 is not available for other use. Consequently, for a UE 12 that uses or attempts to use two or more communication services at the same time, where both services are subject to online charging against the same pool of credit—e.g., against the same credit repository 38—the grants made for one communication service "compete" with the grants made for the other ones of the communication services. As an example, assume two communication services A and B have a pool of credit containing 100 units of credit. If a grant of service units for authorizing consumption of the communication service A requires a credit reservation of, say, 75 credit units, only 25 credit units remain available for authorizing consumption of the communication service B, at least while the reservation of 75 credit units for the communication service A is outstanding.

Therefore, the service-unit grants for the communication services A and B may be regarded as being in competition, in that the credit reservations corresponding to granted quotas for one of the services reduces the available credit for reservation when granting quotas to the other one of the services. According to one or more embodiments disclosed herein, a preferential granting scheme applies for granting quotas of service units in response to competing requests for grants of service units, where the competing requests involve a first communication service that a subscriber has designated as a prioritized service and a second communication service that the subscriber has not designated as prioritized. Of course, the preferential granting scheme extends readily to multiple prioritization levels—e.g., greater and less priorities—and to competition between any number of communication services or types of services.

Before delving into the example details for preferential granting schemes that may be implemented in a charging system node, certain aspects of the charging system node 30 are useful to consider. First, the charging system node 30 may be a single node, e.g., a single server, or part of a server, or may be distributed, e.g., implemented across two or more servers. Further, the charging system node 30 may be implemented in a data center or other cloud-computing environment, where the charging system node 30 is a virtual machine, or a part thereof, based on the instantiation of virtualized processing and memory resources within a physical host computer.

Other points of flexibility including the subscriber database 32, which may be a centralized or a distributed database, and which may be stored in the charging system node 30 or may simply be accessible to it. Further, the subscriber database 32 may be implemented in or associated with another communication network, e.g., a home network of a UE 12. Wherever implemented and however implemented, the charging system node 30 uses the subscriber information 34 linked to a given UE 12, to determine whether a subscriber associated with the UE 12 has designated one or more communication services as being prioritized. Such a determination may be made by the charging system node 30 in a case where there is competition between the online charging of two or more communication services involving the UE 12.

Whether implemented as a single node or implemented in a distributed arrangement, an example charging system node 30 includes communication interface circuitry 40 for communicating with other nodes in or external to the charging system 28. In a non-limiting example, the communication interface circuitry 40 includes one or more transmitter circuits 42 and one or more receiver circuits 44 that implement wired or wireless physical interfaces, for receiving and sending charging-related signaling, such as receiving requests for grants of service units to authorize communication-service consumption and sending return response that indicates granted quotas (or denials in a case of insufficient credit). The communication interface circuitry 40 in at least one embodiment includes the physical-layer interface circuits, along with one or more protocol processors, timing circuits, etc., for implementing the involved communication protocols and signaling.

Further included in the charging system node 30 is processing circuitry 46, which may or may not use "virtualization" which involves the instantiation of virtualized processing resources using underlying processing hardware, as coordinated by the involved operating system and virtualization software. Even with virtualization, the processing circuitry 46 comprises physical circuitry that is fixed circuitry or programmatically-configured circuitry or some combination of fixed circuitry and programmatically-configured circuitry.

In one or more embodiments, the processing circuitry 46 comprises one or more microprocessors, digital signal processors (DSPs), field programmable gate arrays (FGPAs), complex programmable logic devices (CPLDs), or application-specific integrated circuits (ASICs), or any combination thereof. Further, in at least one such embodiment, the processing circuitry 46 is configured, at least in part, based on its execution of stored computer-program instructions. For example, the storage 48 stores one or more computer programs (CP(s)) 50 comprising program instructions for execution by one or more microprocessors or other type of computer processor used to form the processing circuitry 46. The storage 48, which comprises one or more types of computer-readable media, such as memory circuits and/or disk storage, also may store various items of configuration data (CFG. DATA) 52. Example configuration data, which may be provisioned within or temporarily stored in the storage 48, includes information about charging-interval sizes for charging different types of communication services, rating data for determining the price or cost of service units, rules for granting quotas, etc.

Keeping in mind the above points of flexibility and variation, the charging system node 30 is configured for operation in a charging system 28 that is associated with the communication network 10. The charging system node 30 includes communication interface circuitry 40 comprising a wired or wireless communication interface for exchanging charging-related messages with one or more other nodes in the charging system 28 or the communication network 10. Further, the charging system node 30 includes processing circuitry 46 that is operatively associated with the communication interface circuitry 40. In at least one example case, referring to the processing circuitry 46 as being operatively associated with the communication interface circuitry 40 means that the processing circuitry 46 is arranged or otherwise configured to send and receive messages or other signaling, possibly of various types and involving more than one protocol, via the communication interface circuitry 40.

In an example embodiment, the processing circuitry 46 is configured to receive a request for a grant of service units for authorizing consumption of a first communication service provided by the communication network 10 to a user equipment (UE) 12 that is associated with subscriber information 34 maintained by or accessible to the charging system node 30. A "service unit" refers to a unit of service consumption. For example, a service unit may be expressed in terms of minutes, megabytes, or any quantum used for metering the involved communication service. To use or continue to use a communication service, an entity in the communication network 10, such as a Charging Trigger Function (CTF), sends a charging request to the charging system 28. The charging system 28 determines the number of service units to grant in response to the request. The size of the grant is also referred to as the quota. The service units are "rated" based on the applicable tariffs, which may depend on a variety of factors, to determine the "cost" in terms of the credit reservation needed for the granted quota. As previously noted, reserved credit is "blocked" when it is, at least temporarily, unavailable for other uses, i.e., credit that is subject to an open or unreconciled reservation is not available for authorizing other grants.

The processing circuitry 46 is further configured to determine from the subscriber information that a subscriber associated with the subscriber information has designated the first communication service as a prioritized communication service. Still further, the processing circuitry 46 is further configured to apply a preferential granting scheme in which granting service units in response to the request for the first communication service is prioritized with respect to a competing request for a grant of service units for a second communication service that is not prioritized according to the subscriber information.

In one example, to apply the preferential granting scheme, the processing circuitry 46 is configured to increase a quota size used for granting service units in response to the request for the first/prioritized communication service, where the increase is relative to a quota size that would be used absent grant competition between prioritized and non-prioritized communication services. As another example, to apply the preferential granting scheme, the processing circuitry 46 is configured to decrease a quota size used for the competing grant of service units, where the decrease is relative to a quota size that would be used absent grant competition between prioritized and non-prioritized communication services.

Increasing the grant size for a prioritized communication service amounts to making more aggressive or larger reservations of credit for the prioritized communication service than would otherwise be made absent use of the preferential granting scheme. Making larger credit reservations for the prioritized communication service leaves less credit available for the non-prioritized communication services for which competing (charging) requests are being made. Similarly, decreasing the grant size used for the non-prioritized communication services that are in competition with a prioritized communication service amounts to making less aggressive credit reservations for the non-prioritized communication services and thereby leaving more credit available for grants for the prioritized communication service. And, as noted, the preferential granting scheme may decrease the size of competing grants made for non-prioritized services or increase the size of grants made for the prioritized communication service or do both.

As explained elsewhere, a grant of service units for a "second" communication service competes with the grant of service units for a "first" communication service based on the involved UE 12 having or attempting to have overlapping sessions for the first and second communication services, and further based on the respective grants requiring corresponding credit reservations from a same source of credit. Here, "session" refers to a communication session for the given communication service and/or refers to the charging session that runs concurrent with the communication session, for online charging of the service consumption recorded during the communication session. Further, "overlapping" refers to an overlap in time, where the UE 12 has or attempts to have two or more communication sessions that are subject to online charging active at the same time.

Consider an example where, for given circumstances and in the absence of the preferential granting scheme, the quota size that would be granted for a charging request received for a "first communication service is 10 megabytes (10 MB). However, responsive to applying the preferential granting scheme as a consequence of grant competition, the preferential granting scheme increases the quota size by twenty percent, here, 2 MBs. Alternatively, or additionally, the preferential granting scheme decreases the quota size for the competing services by, say, twenty percent, as compared to the quota size that would be used for those services if the preferential granting scheme were not being applied.

Thus, in at least one embodiment, to apply the preferential granting scheme, the processing circuitry 46 is configured to override temporarily an existing granting scheme that would be used absent the prioritized designation for the first communication service. As a specific example, to apply the preferential reservation scheme, the processing circuitry 46 is configured to override a Dynamic Service Configuration (DSC) scheme that dynamically adjusts quota sizes used for granting service units in dependence on requested and used numbers of service units for communication services in use at a UE 12. "Overriding" the DSC scheme comprises, for example, doing any one or more of: temporarily slowing the growth in quota sizes allowed for the non-prioritized communication services, temporarily accelerating the growth in quota sizes allowed for the prioritized communication service, temporarily changing the quota sizes used for the non-prioritized communication services to a fixed value, e.g., a small size, or temporarily changing the quota sized for the prioritized communication service to a fixed value, e.g., a large size.

In one example, the processing circuitry 46 is configured to override an existing granting scheme for the duration of a session established with respect to consumption of a prioritized communication service by a UE 12. Alternatively, the processing circuitry 46 overrides the existing granting scheme only if there is grant competition between a prioritized communication service and a non-prioritized communication service or, more generally, between two communication services having different priority designations from the associated subscriber. As noted, the existing reservation scheme may be a DSC scheme that, for each given communication service for which a UE 12 requests grants of service units, corresponding quota sizes for granting service units are determined dynamically as a function of ongoing quota usage.

The prioritized designation is received, for example, as a runtime input to the charging system 28 that comprises or contains the charging system node 30, where the charging system 28 operates as an OCS. In at least one embodiment, the processing circuitry 46 is configured to receive input from a UE 12 associated with a subscriber or from a computer system associated with the subscriber, with the input indicating that a particular communication service has been prioritized by the subscriber.

Of course, the subscriber may designate more than one communication service as a priority and prioritized granting may be activated when any prioritized communication service competes with a non-prioritized communication service in an online charging sense—i.e., when granting quotas of service units for authorization of service consumption and making corresponding credit reservations for a subscriber-prioritized communication service competes with granting quotas of service units for authorization of service consumption and making corresponding credit reservations for a communication service that has not been prioritized by the subscriber or has been given a lower-priority designation by the subscriber.

The processing circuitry 46 in one or more embodiments is configured to maintain a database operative to register prioritization designations input by the subscriber for respective communication services or types of communication services. See, for example, the subscriber database 32 depicted in FIG. 2.

Figure 3:
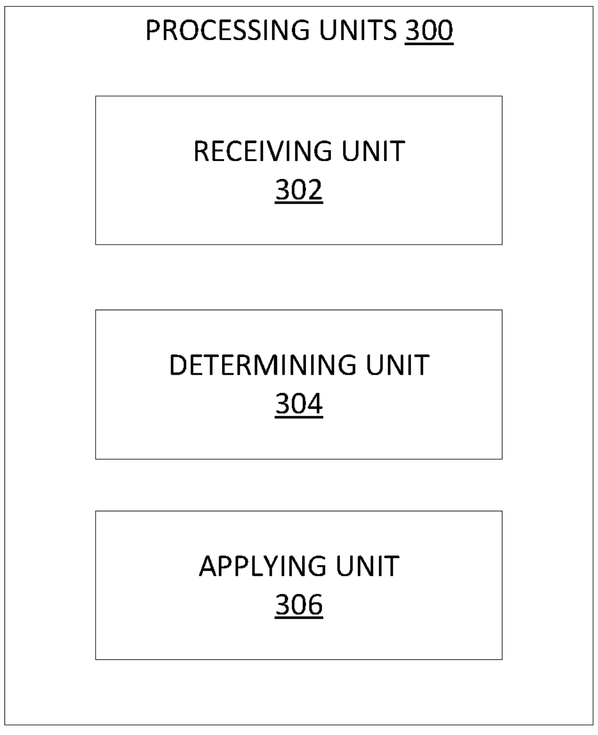
FIG. 3 is a block diagram of another embodiment of a network node of an online charging system, with the node also referred to as a charging system node.

FIG. 3 illustrates another embodiment of a network node that is configured for operation in a charging system 28 for a communication network 10, where the network node comprises several processing modules or units 300. The depicted collection of processing units 300 may be realized, for example, via the processing circuitry 46 of the charging system node 30 shown in FIG. 2. In general, the processing units 300 may be virtual or non-virtual sets of configured processing resources, e.g., programmatically configured computing resources comprising physical processing circuitry or instantiated as virtualized processing circuitry on underlying physical processing circuitry.

Among the illustrated processing units 300, there is a receiving unit 302 that is configured to receive a request for a grant of service units for authorizing consumption of a first communication service provided by the communication network 10 to a UE 12 that is associated with subscriber information 34 maintained by or accessible to the network node comprised by the processing units 300. Further included is a determining unit 304 that is configured to determine from the subscriber information 34 that a subscriber associated with the subscriber information 34 has designated the first communication service as a prioritized communication service; and an applying unit 306 that is configured to apply a preferential granting scheme in which granting service units in response to the request is prioritized with respect to a competing request for a grant of service units for a second communication service that is not prioritized according to the subscriber information 34.

Figure 4:
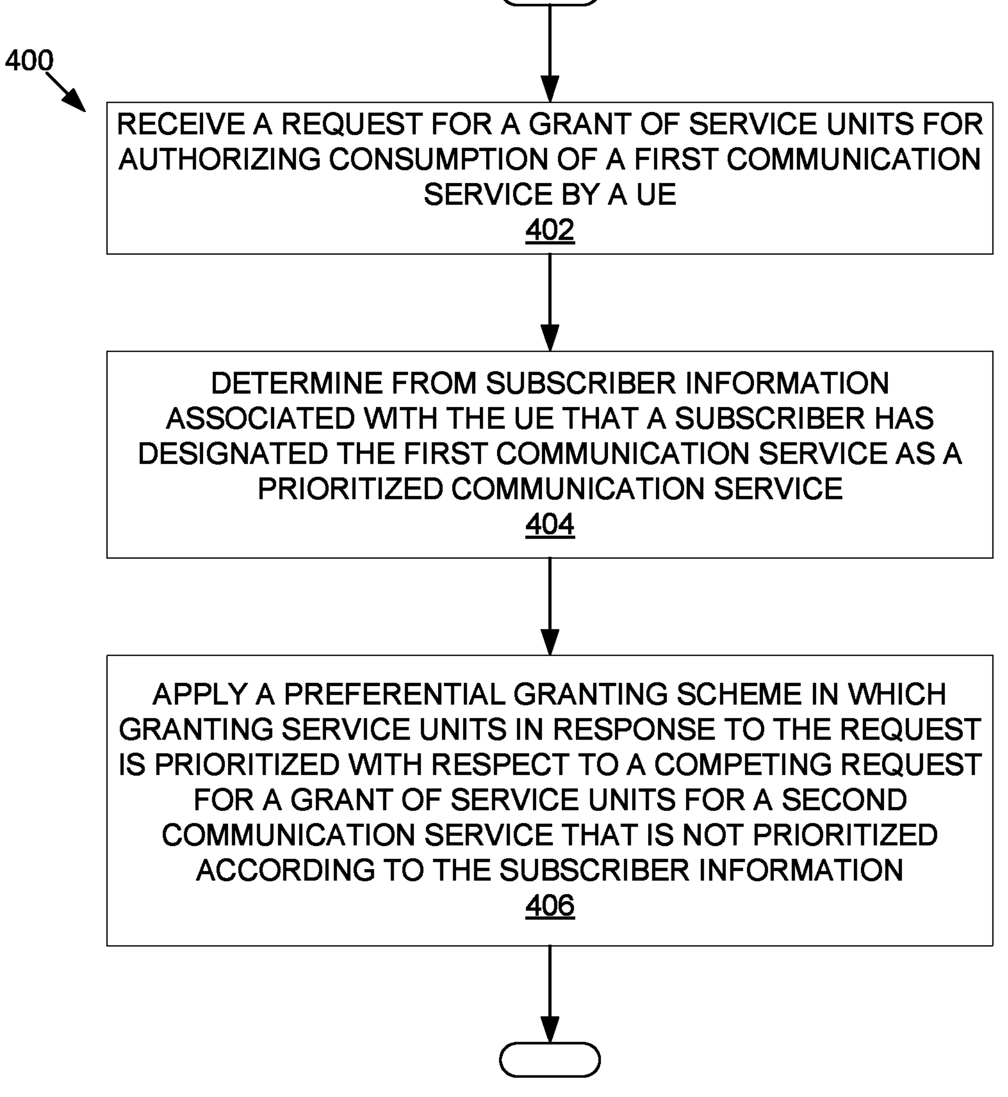
FIG. 4 is a logic flow diagram of one embodiment of a method performed by a network node of an online charging system.

FIG. 4 is a logic flow diagram of one embodiment of a method of operation by a network node 30 of a charging system 28. The method 400 includes the charging system node 30 receiving (Block 402) a request for a grant of service units for authorizing consumption of a first communication service provided by the communication network 10 to a UE 12 that is associated with subscriber information 34 maintained by or accessible to the network node 30. Further, the method 400 includes the charging system node 30 determining (Block 404) from the subscriber information 34 that a subscriber associated with the subscriber information 34 has designated the first communication service as a prioritized communication service. Still further, the method 400 includes the charging system node 30 applying (Block 406) a preferential granting scheme in which granting service units in response to the request is prioritized with respect to a competing request for a grant of service units for a second communication service that is not prioritized according to the subscriber information 34.

Applying the preferential granting scheme comprises, for example, increasing a quota size used for granting service units in response to the request, where the increase is relative to a quota size that would be used absent grant competition between prioritized and non-prioritized communication services. As another example, applying the preferential granting scheme comprises decreasing a quota size used for the competing grant of service units, where the decrease is relative to a quota size that would be used absent grant competition between prioritized and non-prioritized communication services. Of course, a mix of the two approaches may be used to effect the grant prioritization.

The grant of service units for the second communication service "competes" with the grant of service units for the first communication service based on the UE 12 having or attempting to have overlapping sessions for the first and second communication services, and further based on the respective grants requiring corresponding credit reservations from a same source of credit. For example, charging for the respective first and second communication services may target the same pool of credit, meaning that credit reservations for one of the two services makes that reserved credit unavailable, at least temporarily, for use with the other one of the two services.

Applying the preferential granting scheme comprises, for example, temporarily overriding an existing granting scheme that would be used absent the prioritized designation for the first communication service. In at least one embodiment, applying the preferential granting scheme comprises overriding a DSC scheme that dynamically adjusts quota sizes used for granting service units in dependence on requested and used numbers of service units for respective communication services in use at the UE 12. The DSC scheme may be a default or normal scheme that is used for at least some types of communication services, absent application of the preferential granting scheme.

In particular, the existing granting scheme may be a DSC scheme that, for each given communication service for which the UE 12 requests grants of service units, corresponding quota sizes for granting service units are determined dynamically as a function of ongoing quota usage. DSC improves efficiency by allowing the quota size to grow over successive grants withing the same charging session, based on the rate of quota consumption. Whether the overridden grant scheme is DSC-based or based on another methodology, applying the preferential granting scheme comprises overriding an existing granting scheme, at least for the duration of a session established with respect to consumption of the first communication service by the UE 12.

That is, the charging system node 30 overrides any existing grant scheme that would otherwise be used, in response to determining that, for a given UE 12 linked to corresponding subscriber information 34, a non-prioritized (or lower-priority) communication service is competing for grants with respect to a prioritized (or higher-priority) communication service. As noted, the prioritized designation(s) may be received as a runtime input to the charging system 28 in which the charging system node 30 is comprised. A subscriber uses, for example, the UE 12 or a computer system to provide input(s) that trigger recordation of the subscriber-designated prioritizations within the subscriber database 32.

Figure 5:
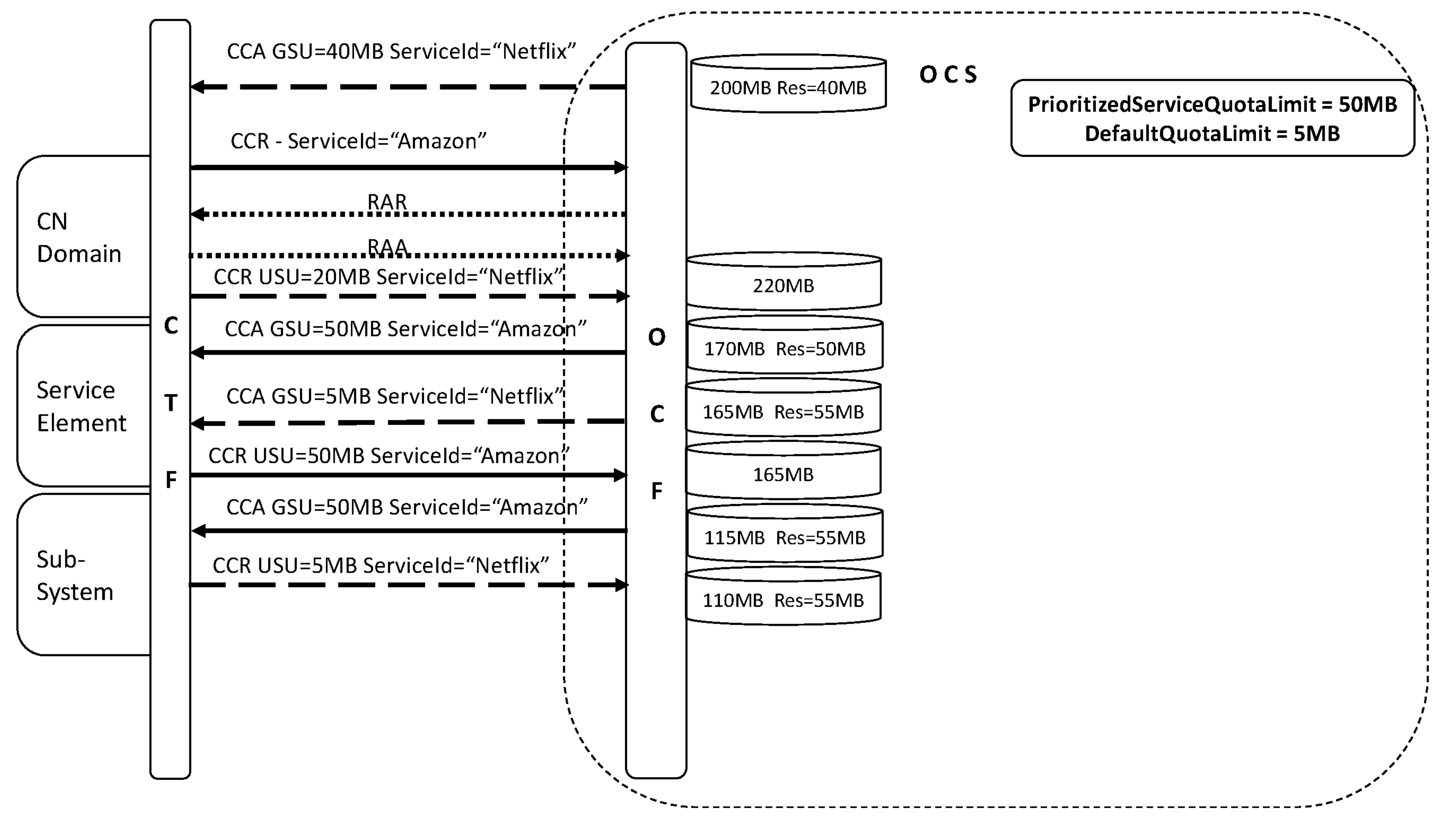
FIG. 5 is a message sequence diagram of example implementation details performed by a network node of an Online Charging System.

FIG. 5 is a message sequence diagram of example implementation details performed by a charging system 28 that includes an Online Charging Function (OCF) that is operative to apply preferential granting schemes as described herein. The Core Network (CN) domain, Service Element, and Sub-system entities shown represent elements of the communication network 10 that include or are associated with Charging Trigger Functions (CTFs), shown in the diagram collectively as a "CTF".

The example assumes DIAMETER-based credit control operations and assumes that a UE 12 is engaged in or initiates a communication session with the NETFLIX media streaming service, via the communication network 10, such that there is an online charging session open for the UE 12 in the charging system 28, for online charging for the NETFLIX service. Subsequently, the same UE 12 attempts to initiate a communication session with the AMAZON media streaming service, such that the charging system 28 opens an online charging session for the UE 12, for online charging for use of the AMAZON service.

Further, one may assume that granting quotas for authorizing use of the two services, NETFLIX and AMAZON, represent competing grants because the corresponding reservations of credit involve the same pool of credit or, equivalently, because the corresponding reservations of service units involve the same pool of available service units. The diagram depicts changing service-unit availabilities in correspondence with changing quota sizes as a consequence of applying a preferential granting scheme where, as a final assumption, the involved subscriber information 34 indicates that AMAZON is designated as a prioritized communication service and NETFLIX is not so designated.

In the illustrated message flow, the OCF returns a Credit Control Authorization (CCA) for the "NETFLIX" session. The CCA for the NETFFLIX session includes a granted quota size of 40 MB, denoted in the illustration as "GSU" to indicate "Granted Service Units". The returned CCA for the NETFLIX session corresponds, for example, to an earlier Credit Control Request (CCR) that is not shown in FIG. 5, where the CCR requested a grant of service units for authorizing initial or continued consumption of the NETFLIX service.

The OCF then receives a CCR requesting establishment of a charging session for parallel use of the AMAZON service by the same UE 12. That is, the charging session for AMAZON will overlap with the existing charging session for NETFLIX. Recognizing that the parallel service usage puts the granting process for the AMAZON session in competition with that of the NETFLIX session, and further recognizing that the involved subscriber prioritized AMAZON service over NETFLIX service, the OCF sends a Re-Authorization Request (RAR) for the NETFLIX session, and thereby elicits a Re-Authorization Answer (RAA) and triggers a new CCR from the Charging Trigger Function (CTF) in the communication network 10 that is associated with the NETFLIX session. The new CCR indicates Used Service Units (USU) as 20 MBs—i.e., 20 MBs have been consumed from the previously granted quota of 40 MB.

The OCF responds to the CCR for the AMAZON session by sending a CCA granting a quota of 50 MB for the AMAZON session and sends a CCA granting 5 MB for the NETFLIX session. Notably, the 5 MB quota for the NETFLIX session represents an aggressive reduction in the quota size used for the NETFLIX session—i.e., application of a preferential granting scheme in which granting operations favor the AMAZON session over the NETFLIX session, in consideration of the subscriber-indicated prioritization of the AMAZON communication service over the NETFLIX communication service. FIG. 5 illustrates that, at least during the time that the AMAZON session overlaps with the NETFLIX session, the OCF continues to provide relatively small grants for the NETFLIX session—e.g., 5 MB—while providing relatively large grants for the AMAZON session, e.g., 50 MB.

As an example understanding of the operations depicted in FIG. 5, assume that the default granting scheme used by the OCF is a form of DSC, such that grants for the NETFLIX session would have grown dynamically over the course of the session, in dependence on the rate of grant consumption, with the advantage of such growth being a reduction in the number of requests/grants needed for the NETFLIX session. However, responsive to establishment of the higher-priority AMAZON session, the OCF changes to a preferential granting scheme that favors the AMAZON session by abandoning the DSC scheme and fixing the quota size for the NETFLIX session to a defined small size, which could be defined according to rules, policies, the type of service, etc. Further, the quota size for the AMAZON session may be immediately set to a comparatively large or generous size, which again can be defined by rules, policies, the type of service, etc. Alternatively, the OCF may apply a DSC-based granting scheme to the AMAZON session (i.e., a dynamically adjusted quota size), while applying a fixed granting scheme to the NETFLIX session (i.e., a fixed quota size).

FIG. 5, in particular, shows that a prioritized-service quota is defined as 50 MB in size, while a non-prioritized service quota is defined as 5 MB in size. Thus, applying a preferential granting scheme comprises, for example, temporarily overriding whatever granting/quota-size scheme is in play and applying the fixed 50 MB/5 MB scheme for prioritized and non-prioritized communication services. Further, the quota sizes used to address the problem of competing grants may be defined to account for how many non-prioritized or lower-priority communication services are in competition with a prioritized or higher-priority communication service. For example, more aggressive quota-size reductions can be applied when there are more services in competition.

The ServiceId seen in FIG. 5 along with a "Rating Group" may be used to distinguish different services for pricing and quota allocation. The subject matter disclosed herein may expose the Service Ids and/or Rating Groups to subscribers via a self-Care tool (e.g., a user portal or application "APP"). When a subscriber wants a certain service to be prioritized, the user first selects the service and then registers for priority from the selfcare portal or APP.

Prioritizations may be persistent such that they apply until removed by the subscriber or removed or overridden by the network operator. Or prioritizations may be non-persistent, e.g., one-time or temporary. As an example corresponding to FIG. 5, the involved subscriber prioritizes the AMAZON service and that priority applies only to the first usage of the AMAZON service subsequent to recordation of the prioritization in the subscriber database 32, or only to the first instance of the AMAZON service being in grant competition for that subscriber.

Figure 6:
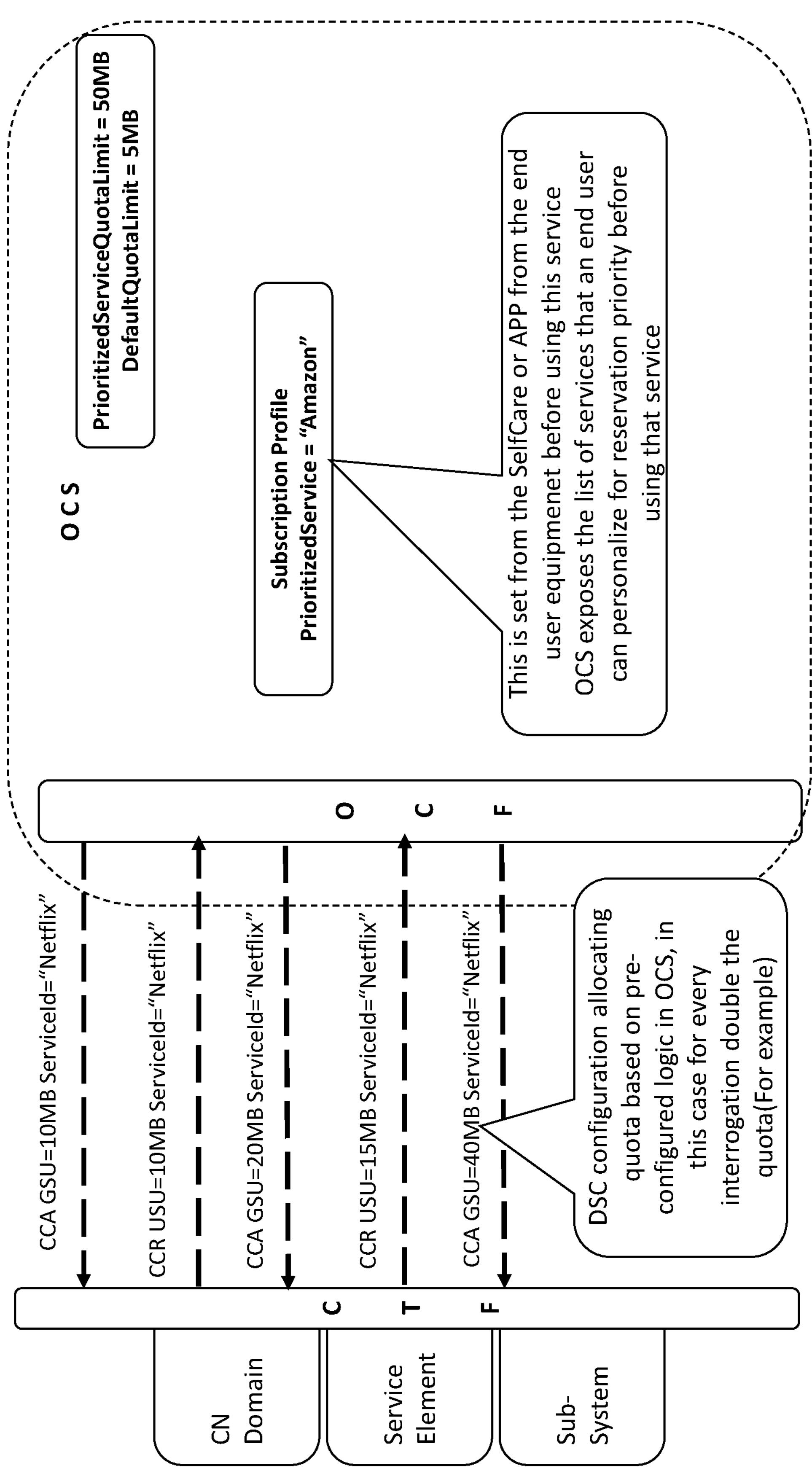
FIG. 6 is a message sequence diagram of example implementation details performed by an Online Charging System for determining a priority for a service by a subscriber while there is already another service ongoing.

FIG. 6 is another example of message sequence diagram of example implementation details performed by a charging system 28 for determining a priority for a service by a subscriber while there is already another service ongoing. In FIG. 6, the charging system 28 exposes the list of service IDs/RatingGroup IDs for which the subscriber can designate the priority of a service. The service ID/RatingGroup ID are used in the operator selfCare application or APP to list the available services and rating groups allowed to be selected by the subscriber for designating as a priority service. When the subscriber selects a service, the selected service is persisted back to the charging system 28 under the subscription information. The subscription information can be stored in various locations, such as a customer and partner management system or any other node which can be accessed by the charging system 28.

Referring to FIG. 6, the charging system 28 sends a CCA indicating 10 MB of granted service units (GSU=10 MB) for ServiceId=NETFLIX. During this ongoing session, the NETFLIX service sends a CCR to the charging system 28 requesting additional quota be allocated. The CCR further indicates that the number of unused service units is 10 MB (USU=10 MB). Applying DSC, the charging system 28 doubles the previously granted 10 MB quota and returns a CCR to the NETFLIX service for GSU=20 MB. At the next interrogation, the NETFLIX service sends a CCR to the charging system 28 indicating USU=15 MB which is 5 MB less than was allocated. The charging system 28, again applying DSC, doubles the previously allocated 20 MB quota and returns a CCR to the NETFLIX service for GSU=40 MB. This illustrates the use of a non-prioritized service that is not overridden by a "PrioritizedService-QuotaLimit" because, in this example, the NETFLIX service is not designated by the user as prioritized in the subscriber information.

Figure 7:
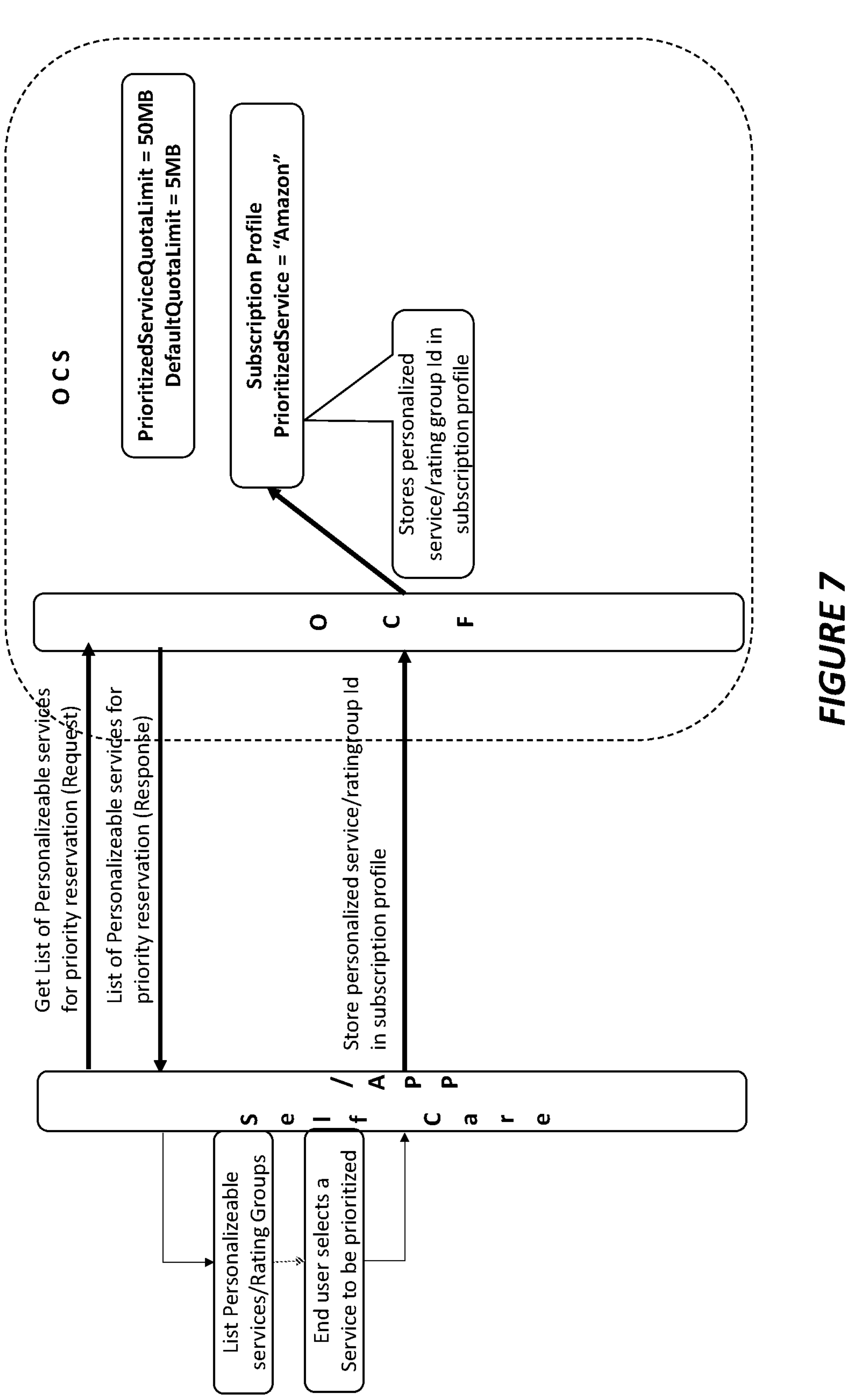
FIG. 7 is a message sequence diagram of example implementation details for an end-to-end message flow performed by a network node of an Online Charging System.
Figure 8:
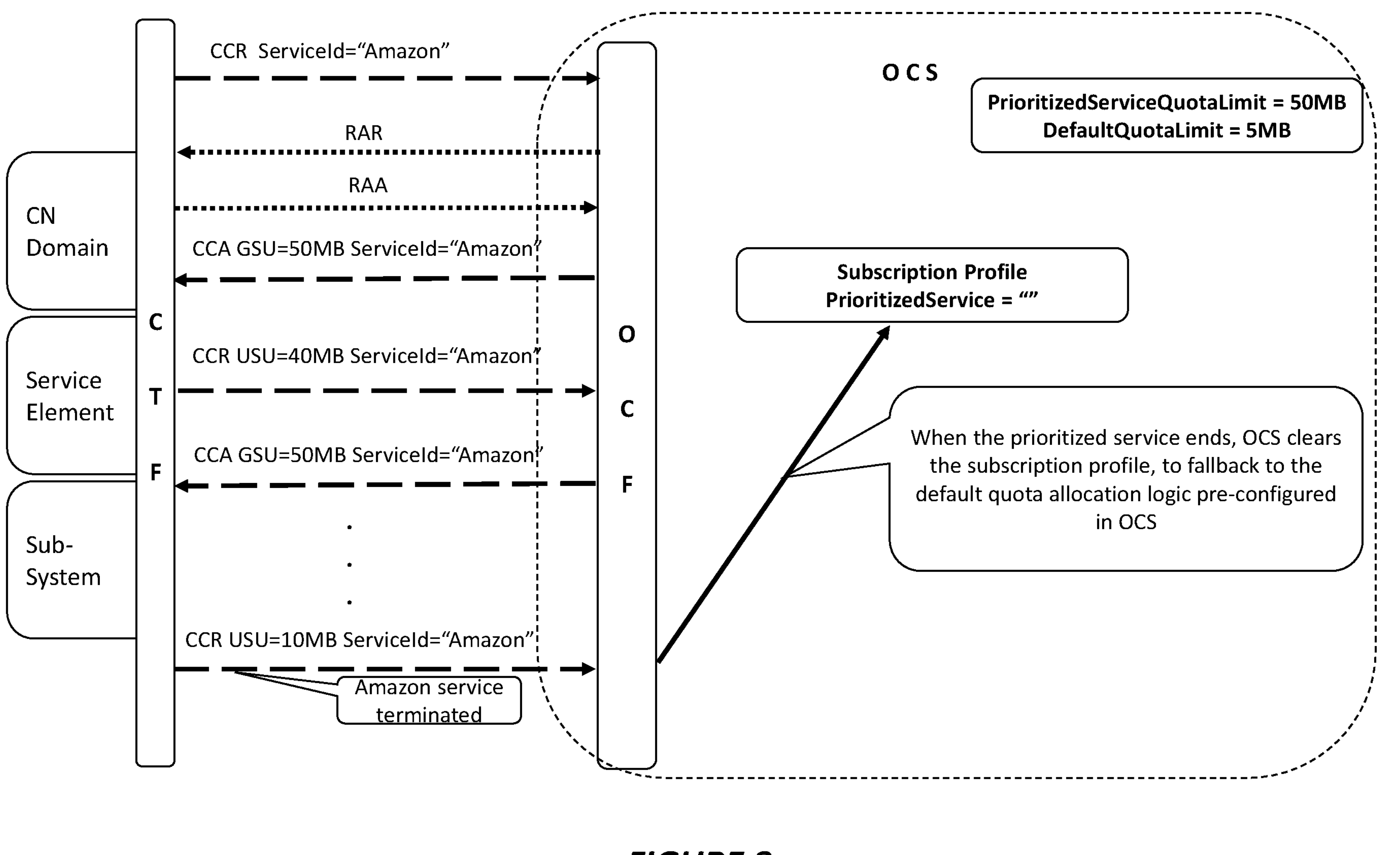
FIG. 8 is a message sequence diagram of example implementation details for continuing the end-to-end message flow of FIG. 7.

FIGS. 7 and 8 show a message sequence diagram of example implementation details for an end-to-end flow performed by a network node 30 of a charging system 28. In FIG. 7, the SelfCare function or App requests a list of services from the charging system 28 that can be designated by the subscriber as prioritized. The charging system 28 returns a response indicating or including the list of services available for priority designation. Via the SelfCare/App, the subscriber selects a service to be prioritized from the list of service IDs/rating group IDs. This selection is sent to the charging system 28, which stores the service ID/rating group ID in the subscriber information 34. For example, the user may designate the "AMAZON" service to be prioritized and the charging system 28 may store PrioritizedService="AMAZON" in the subscriber information 34 linked to the involved subscriber.

FIG. 8 is a message sequence diagram of example implementation details for continuing the end-to-end flow illustrated in FIG. 7. In FIG. 8, the user starts an "AMAZON" service and sends a CCR for ServiceID="AMAZON" to the charging system 28. The charging system 28 sends a RAR to the main session when the charging system 28 finds a request for a prioritized service session. This RAR may be sent so that service sessions report the USU to the charging system 28. For example, the AMAZON service session response to the RAR is a RAA.

Next, the charging system 28 sends a CCA indicating GSU=50 MB for the AMAZON service because the AMAZON service is prioritized and the PrioritizedService- QuotaLimit=50 MB. At the next charging interval/interrogation, the charging system 28 receives a CCR for the AMAZON service indicating USU=40 MB. Again, the charging system 28 sends a CCA indicating GSU=50 MB for the AMAZON service. This process of requests and authorizations continues for one or more subsequent charging intervals. At the end of the sequence shown, the charging system 28 receives a CCR for the "Amazon" service indicating USU=10 MB and the service is terminated. When the service ends, the charging system 28 clears the subscriber information 34 to fall back to the default granting scheme logic that is pre-configured in the charging system 28. In this case, a DSC-based granting scheme. Clearing the subscriber information 34 is accomplished by setting the Prioritized-Service=" " in the subscriber information.

The techniques disclosed herein may be extended to assign priority in advance for a certain time-period and/or volume of service consumption. For example, a subscriber may indicate, designate, or otherwise assign a priority for a given communication service at a time prior to using the communication service. This may include indicating that a communication service (e.g., NETFLIX) should be given a higher priority when used between the hours of 5 pm and 10 pm, but otherwise subject to a default priority. Thus, an charging system 28 in one or more embodiments adjusts the granting scheme it applies when granting quotas for the consumption of respective communication services in dependence on whether there are competing grants for communication services having different subscriber-designated priorities and whether one or more other conditions for applying those priorities are fulfilled. Conditions included any one or more of the combination of services that are in use, the time of day, the date, or the location of the UE 12 involved in the consumption, etc.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method performed by a network node of a charging system for a communication network, the method comprising:

receiving a request for a grant of service units for authorizing consumption of a first communication service provided by the communication network to a user equipment (UE) that is associated with subscriber information maintained by or accessible to the network node;

determining from the subscriber information that a subscriber associated with the subscriber information has designated the first communication service as a prioritized communication service; and applying a preferential granting scheme in which granting service units in response to the request is prioritized with respect to a competing request for a grant of service units for a second communication service that is not prioritized according to the subscriber information, wherein the prioritized communication service is communicated by the subscriber via a portal or an application, wherein the network node of a charging system exposes a list of service IDs/Rating Group IDs to the subscriber through the portal or application, wherein applying the preferential granting scheme comprises temporarily overriding an existing granting scheme that would be used absent the prioritized designation for the first communication service.

2. The method of claim 1, wherein applying the preferential granting scheme comprises increasing a quota size used for granting service units in response to the request, where the increase is relative to a quota size that would be used absent grant competition between prioritized and non-prioritized communication services.

3. The method of claim 1, wherein applying the preferential granting scheme comprises decreasing a quota size used for the competing grant of service units, where the decrease is relative to a quota size that would be used absent grant competition between prioritized and non-prioritized communication services.

4. The method of claim 1, wherein the grant of service units for the second communication service competes with the grant of service units for the first communication service based on the UE having or attempting to have overlapping sessions for the first and second communication services, and further based on the respective grants requiring corresponding credit reservations from a same source of credit.

5. The method of claim 1, wherein the existing granting scheme is a Dynamic Service Configuration (DSC) scheme that, for each given communication service for which the UE requests grants of service units, corresponding quota sizes for granting service units are determined dynamically as a function of ongoing quota usage.

6. The method of claim 1, wherein the prioritized designation is received as a runtime input to the charging system.

7. The method of claim 1, wherein the method further comprises receiving input from the UE or from a computer system associated with the subscriber, the input indicating that the first communication service has been prioritized by the subscriber.

8. A network node configured for operation in a charging system for a communication network, the network node comprising:

communication interface circuitry; and processing circuitry configured to:

receive, via the communication interface circuitry, a request for a grant of service units for authorizing consumption of a first communication service provided by the communication network to a user equipment (UE) that is associated with subscriber information maintained by or accessible to the network node;

determine from the subscriber information that a subscriber associated with the subscriber information has designated the first communication service as a prioritized communication service; and apply a preferential granting scheme in which granting service units in response to the request is prioritized with respect to a competing request for a grant of service units for a second communication service that is not prioritized according to the subscriber information, wherein the prioritized communication service is communicated by the subscriber via a portal or an application, wherein the network node of a charging system exposes a list of service IDs/Rating Group IDs to the subscriber through the portal or application, wherein applying the preferential granting scheme comprises temporarily overriding an existing granting scheme that would be used absent the prioritized designation for the first communication service.

9. The network node of claim 8, wherein, to apply the preferential granting scheme, the processing circuitry is configured to increase a quota size used for granting service units in response to the request, where the increase is relative to a quota size that would be used absent grant competition between prioritized and non-prioritized communication services.

10. The network node of claim 8, wherein, to apply the preferential granting scheme, the processing circuitry is configured to decrease a quota size used for the competing grant of service units, where the decrease is relative to a quota size that would be used absent grant competition between prioritized and non-prioritized communication services.

11. The network node of claim 8, wherein the grant of service units for the second communication service competes with the grant of service units for the first communication service, based on the UE having or attempting to have overlapping sessions for the first and second communication services, and further based on the respective grants requiring corresponding credit reservations from a same source of credit.

12. The network node of claim 8, wherein, to apply the preferential reservation scheme, the processing circuitry is configured to override a Dynamic Service Configuration (DSC) scheme that dynamically adjusts quota sizes used for granting service units in dependence on requested and used numbers of service units for communication services in use at the UE.

13. The network node of claim 8, wherein the prioritized designation is received as a runtime input to the charging system.

14. The network node of claim 8, wherein, to apply the preferential granting scheme, the processing circuitry is configured to override an existing granting scheme for the duration of a session established with respect to consumption of the first communication service by the UE.

15. The network node of claim 14, wherein the existing reservation scheme is a Dynamic Service Configuration (DSC) scheme that, for each given communication service for which the UE requests grants of service units, corresponding quota sizes for granting service units are determined dynamically as a function of ongoing quota usage.

16. The network node of claim 8, wherein the processing circuitry is configured to receive input from the UE or from a computer system associated with the subscriber, the input indicating that the first communication service has been prioritized by the subscriber.

17. The network node of claim 8, wherein the processing circuitry is configured to maintain a subscriber database operative to register prioritization designations input by the subscriber for respective communication services or types of communication services.

18. A network node configured for operation in a charging system for a communication network, the network node configured to:

receive a request for a grant of service units for authorizing consumption of a first communication service provided by the communication network to a user equipment (UE) that is associated with subscriber information maintained by or accessible to the network node;

determine from the subscriber information that a subscriber associated with the subscriber information has designated the first communication service as a prioritized communication service; and apply a preferential granting scheme in which granting service units in response to the request is prioritized with respect to a competing request for a grant of service units for a second communication service that is not prioritized according to the subscriber information, wherein the prioritized communication service is communicated by the subscriber via a portal or an application, wherein the network node of a charging system exposes a list of service IDs/Rating Group IDs to the subscriber through the portal or application, wherein applying the preferential granting scheme comprises temporarily overriding an existing granting scheme that would be used absent the prioritized designation for the first communication service.

* * * * *